United States Patent [19]

Bolmgren et al.

[11] 4,409,602

[45] Oct. 11, 1983

[54] MOSAIC RECORDER WITH IMPROVED NOZZLE STRUCTURE

[75] Inventors: Jan Bolmgren, Vaellingby; Bertil Hoek, Västeras; Kenth Nilsson, Akersberga, all of Sweden

[73] Assignee: Siemens Aktiengesellschaft, Berlin & Munich, Fed. Rep. of Germany

[21] Appl. No.: 361,987

[22] Filed: Mar. 25, 1982

[30] Foreign Application Priority Data

Apr. 8, 1981 [DE] Fed. Rep. of Germany ....... 3114259

[51] Int. Cl.³ .......................... G01D 15/18; B41J 3/04

[52] U.S. Cl. ................................................ 346/140 R

[58] Field of Search .................................... 346/140 R

[56] References Cited

U.S. PATENT DOCUMENTS 4,072,959 2/1978 Elmquist ............................ 346/140

4,282,533 8/1981 Brooks ........................ 346/140 R X 4,303,927 12/1981 Tsao ............................ 346/140 R X

*Primary Examiner*—Joseph W. Hartary

*Attorney, Agent, or Firm*—Hill, Van Santen, Steadman & Simpson

[57] ABSTRACT

A mosaic recorder having a plurality of nozzles for ejecting recording liquid droplets on a moving recording medium for punctiform representation of characters and images, each nozzle having a piezoelectric transducer associated therewith and said nozzles being arranged in a recording head adjacent to one another in rows, has an improved nozzle structure wherein the inlet opening of each nozzle is generally oblong in shape and the nozzle tapers to a smaller circular outlet opening from which the recording liquid is ejected. The relatively large size inlet opening increases the ratio of the inlet opening size to the outlet opening size, thereby increasing the ejection speed of the recording liquid droplet. The hydraulic separation between adjacent nozzles is also increased and the mechanical coupling between adjacent transducers is decreased by the oblong configuration of the inlet opening while the spacing between the nozzle outlet openings remains the same.

10 Claims, 5 Drawing Figures

(PRIOR ART)

MOSAIC RECORDER WITH IMPROVED NOZZLE STRUCTURE

BACKGROUND OF THE INVENTION

1. Field of the Invention

The present invention relates to mosaic recording devices.

2. Description of the Prior Art

Mosaic recording devices are known, as exemplified by German OS No. 2,527,647, which selectively eject recording liquid droplets, such as ink, onto a moving recording medium, such as paper, for punctiform representation of alphanumeric characters and images on the recording medium. Such mosaic recorders have a plurality of nozzles or jets arranged adjacent to one another in rows in a recording head for generating the individual points comprising the representation. The nozzles for such conventional devices have an inlet opening which is relatively large in comparison to the outlet opening, from which the droplet is ejected, with the nozzle tapering from the larger inlet opening to the smaller outlet opening. The inlet openings for the nozzles each have a piezoelectric transducer associated therewith which is movable by the application of a voltage of appropriate polarity thereto so as to effect ejection of a recording liquid droplet from selected ones of said nozzles in response to control signals for generating a character or image on the recording medium.

In recorders of the type described in German OS No. 2,527,647, the action of the piezoelectric transducer alone is not sufficient to eject a recording liquid droplet from the nozzle with sufficient speed to permit the liquid droplet to free itself from the surface adhesion of the opening of the nozzle in the recording head. The above-described tapered design of conventional nozzles, by virtue of laws of fluid mechanics known to those skilled in the art, increases the speed of the liquid droplet so as to impart sufficient energy to the droplet to overcome the surface adhesion upon exit from the nozzle. The factor by which the droplet speed is increased by passage through the nozzles is theoretically maximally equal to the ratio in size between the inlet opening and the outlet opening of the nozzle. In practice, however, the factor by which the droplet speed is increased will be less than the theoretical value as a result of energy losses due to, for example, turbulence of the liquid flow. Such energy losses are also influenced by the shape of the nozzles.

In conventional printers such as the device disclosed in German OS No. 2,527,647, the nozzles are generally conical and have a circular cross-section. The smaller exit opening has a diameter of approximately 50 micrometers in order to insure that a suitable droplet volume is obtained. The larger inlet opening in conventional devices has a diameter of at least 150 micrometers in order to obtain an increase in the ink flow speed by approximately a factor of 9. In order to obtain a clear printout, the nozzles must be disposed closely adjacent one another. It is desirable that the distance between each nozzle be approximately 250 micrometers, and therefore in conventional devices the relative crowding of the nozzles renders a nozzle structure having a suitable diameter of the inlet opening extremely difficult, if not impossible. Moreover, the piezoelectric transducers must be disposed very closely next to one another, because each transducer must cover the inlet opening of the nozzle associated therewith. Such a transducer structure is also difficult to realize in practice. The closely adjacent disposition of the nozzle inlet openings further results in interfering hydraulic coupling between the nozzles, which causes a significant reduction in the recording speed for obtaining a clear graphic presentation, that is, the chronological interval between the activation of two adjacent transducers must be extended.

SUMMARY OF THE INVENTION

It is an object of the present invention to provide a mosaic recorder having a plurality of nozzles for ejecting recording liquid droplets therefrom upon the actuation of an associated transducer in which the exit openings of the nozzles are disposed sufficiently close to one another to obtain a clear graphic presentation and which have inlet openings which are sufficiently large to obtain a high increase in the exit speed of an ejected droplet.

It is a further object of the present invention to provide such a mosaic printer with improved hydraulic separation between the nozzles.

The above objects are inventively achieved in a mosaic printer having a printing head with a plurality of nozzles therein in which the inlet opening for each nozzle is an elongated or longitudinally extended opening, rather than a conventional circular opening, with the longitudinal extension being disposed substantially transversely to the direction of the row containing the nozzle. The elongated inlet opening has an increased area which can be sufficiently large while maintaining close adjacency among the nozzles which is necessary in order to obtain a graphic pattern with no significant gaps. The distance from the edge of one nozzle to the opposite edge of an adjacent nozzle can also be maintained comparatively large in the structure disclosed and claimed herein so that the manufacture of the recording head is not as delicate as in conventional devices so that the nozzles can be manufactured simpler and more economically. The separation further provides an improved hydraulic separation between nozzles thereby permitting a high recording speed.

DESCRIPTION OF THE PREFERRED EMBODIMENTS

Figure 3:
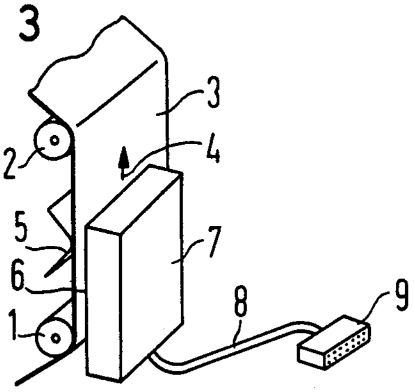
FIG. 3 is a perspective view of a mosaic recorder of the type in which the present invention may be employed showing the essential elements thereof.

The basic elements of a conventional mosaic recorder, in which the inventive nozzle structure disclosed and claimed herein may be employed, are shown in FIG. 3. A recording medium 3, such as paper, is moved by transport rollers 1 and 2 driven by a suitable drive means (not shown) over a spacer 5 in the direction of the arrow 4. The recording medium 3 moves past a side 6 of a recording head mounted inside a housing 7. The recording medium 3 is parallel to and slightly spaced from the side 6. The recording head in the housing 7 is connected via an input/output line 8 to a connector 9 for connection to a suitable control apparatus (not shown) for supplying control signals to the recording head for the representation of desired characters and images.

Figure 4:
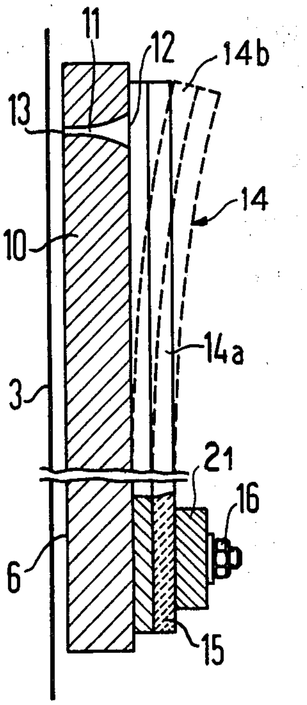
FIG. 4 is a sectional view of a conventional nozzle with an associated transducer element.
Figure 5:
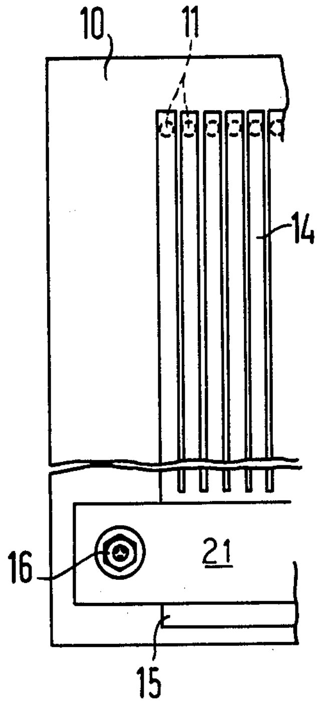
(PRIOR ART) FIG 5
FIG. 5 is a plan view of a portion of a conventional recording head showing a plurality of closely adjacent nozzles and transducer elements.

The arrangement in close adjacency of recording nozzles and the associated transducer elements in conventional mosaic printers is shown in FIGS. 4 and 5. The recording head 10 has a plurality of generally conical nozzles 11 disposed in a row adjacent one another such that a nozzle inlet opening 12 for a recording liquid, such as ink, has a greater area than the nozzle exit opening 13 from which an ink droplet is ejected onto the recording medium 3. Each nozzle 11 has a transducer element 14 comprised of piezoelectric material. Upon activation of a transducer element 14 associated with a particular nozzle 11, an ink droplet will be ejected from that nozzle.

The transducers 14, which are in the form of the teeth of a comb, operate as flexural resonators or oscillators. The transducers 14 are part of a piezoplate which has a base portion 15. The plate is mounted parallel to the recording head 10. The free ends of the individual transducers 14 are respectively disposed in front of the inlet openings of the various nozzles 11. The comb base 15 is mounted to the recording head 10 by a retainer plate 21 held in place by fasteners such as a bolt 16. The piezoplate is comprised of a layer 14*a* of piezoelectric material, such as ceramic, and a carrier layer 14*b*, which may be metal. Upon the application of a voltage of appropriate polarity to the transducer 14, the transducer moves to the position shown in the broken lines in FIG. 4. Upon interruption of the applied voltage, the transducer 14 rebounds to the relatively flat position shown in the solid lines in FIG. 4, thereby forcing a droplet of recording fluid through the nozzle 11.

As is best seen in FIG. 5, the inlet openings 12 of the nozzles 11 disposed in a row must be disposed very closely adjacent to one another, making the manufacture of the recording head considerably more difficult. Additionally, a poor hydraulic separation of the nozzles 11 results from the close adjacency. The transducers 14 must also be applied very closely next to one another in order to cover the associated nozzle inlet openings 12, thereby resulting in a high degree of mechanical coupling between adjacent transducers 14.

Figure 1:
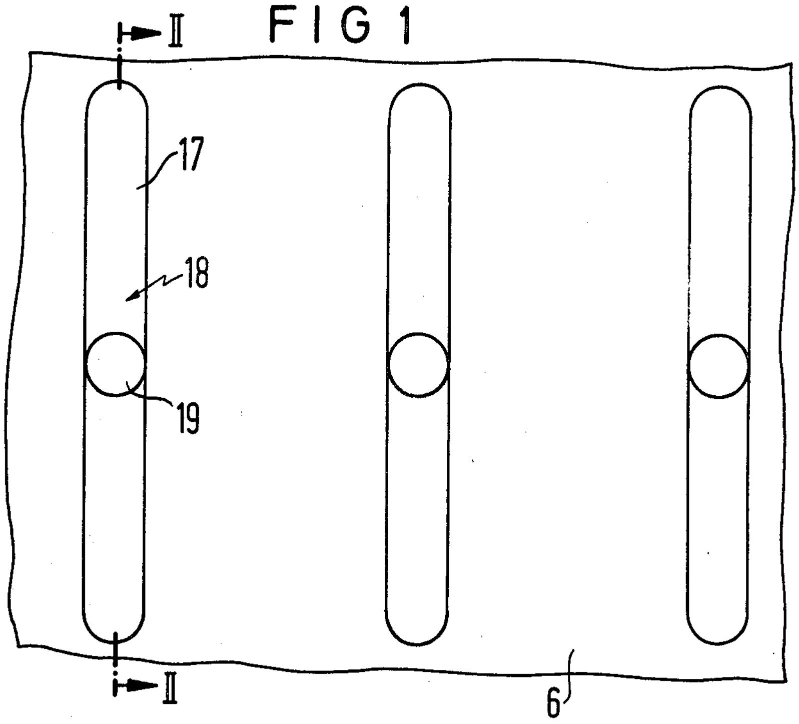
FIG. 1 is a plan view of a portion of a recording head showing three nozzles constructed in accordance with the principles of the present invention.
Figure 2:
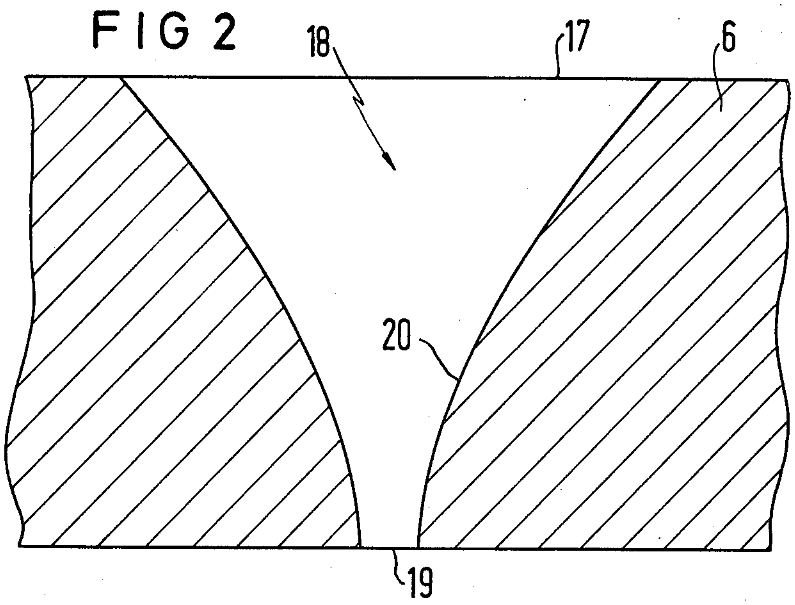
FIG. 2 is a sectional view taken along line II—II of FIG. 1.

An improved nozzle structure is shown in FIGS. 1 and 2. The improved nozzle 18 has an inlet opening 17 which is elongated so as to have an oblong or rectangular shape, as opposed to the circular shape of nozzles in conventional structures. The elongation of the inlet opening 17 is transverse to the row of exit openings 19. The width of the inlet opening 17 is approximately equal to the diameter of the exit opening 19. The inlet opening 17 is generally rectangular or oblong in shape with rounded ends. The ratio of the areas of the inlet opening 17 to the exit opening 19 is in the range of 5:1 to 25:1, and is preferably 10:1. The width of the inlet opening 17 is smaller by at least a factor of 1.5 than the nozzle spacing in a row. As a result of the elongated shape of the inlet opening 17, the distance from one edge of a nozzle to the opposite edge of an adjacent nozzle is comparatively large in contrast to conventional structures. The inlet area of the nozzles 18, however, can be maintained relatively large even though spacing between adjacent nozzles is increased. Additionally, because the nozzles 18 may be spaced farther apart, the adjacent transducers 14 respectively associated with the nozzles 18 can also be spaced farther apart, thereby decreasing the mechanical coupling between such transducers 14, thereby contributing to an increased operational speed.

As shown in FIG. 2, the connecting surface 20 between the inlet opening 17 and the exit opening 19 is generally funnel-shaped and may, for example, follow an exponential curve. Because of this shape, energy losses of the type described above which may be produced due to turbulence in the recording liquid flow are largely avoided. The angle of the funnel surface 20 is selected such that in operation total reflection of the pressure wave applied at the inlet opening 17 by the transducer 14 is avoided.

The transducers 14 can be shaped to correspond to the elongated inlet openings 17 so that, as discussed above, the distance between adjacent transducers can be enlarged, thereby permitting the transducers to be more easily fabricated.

Although modifications and changes may be suggested by those skilled in the art it is the intention of the inventors to embody within the patent warranted hereon all changes and modifications as reasonably and properly come within the scope of their contribution to the art.

We claim as our invention:

1. In a mosaic recorder for printing characters and images on a moving recording medium in punctiform representation, said recorder having a recording head with a plurality of nozzles disposed in rows therein for respectively ejecting droplets of a recording liquid onto said recording medium, each said nozzle having a piezoelectric transducer associated therewith, each transducer being a tooth of a comb-like transducer plate mounted to said recording head, said transducers respectively forcing ejection of said droplets from said nozzles upon respective actuation of said transducers, the improvement comprising:

each of said nozzles having a generally oblong inlet opening tapering to a generally circular exit opening from which said droplet is ejected, said inlet opening of said nozzle being disposed substantially transversely to a row of said nozzles.

2. The improvement of claim 1 wherein said inlet opening has a width substantially equal to a width of said exit opening.

3. The improvement of claim 1 wherein the ratio of the area of said inlet opening to the area of said exit opening is in the range of 5:1 to 25:1.

4. The improvement of claim 3 wherein said ratio is 10:1.

5. The improvement of claim 1 wherein said inlet opening is a rectangle having rounded ends.

6. The improvement of claim 1 wherein said inlet opening has a width which is smaller by at least a factor of 1.5 than the spacing between said nozzles in said row.

7. The improvement of claim 1 wherein each said nozzle has a border surface connecting said inlet opening and said exit opening, and wherein said border surface is funnel-shaped.

8. The improvement of claim 7 wherein said border surface follows an exponential curve.

9. The improvement of claim 7 wherein said surface has an angle with respect to said inlet opening which is selected such that total reflection of a compression wave applied at said inlet opening by the transducer associated therewith does not occur.

10. The improvement of claim 1 wherein each of said transducers has a free end which is matched to the shape of said inlet opening.

* * * * *